United States Patent Office 2,937,973
Patented May 24, 1960

2,937,973

MILK FEVER TREATMENT COMPOSITION

James A. Austin, Mission, and Charles J. Wesley Wiegand, Johnson County, Kans., assignors to Jensen-Salsbery Laboratories, Inc., Kansas City, Mo., a corporation of Missouri No Drawing. Filed Feb. 15, 1954, Ser. No. 410,454

4 Claims. (Cl. 167—53)

This invention relates to new compositions of calcium and/or certain other polyvalent materials, specifically magnesium, manganese, iron and copper, which form stable, injectable, aqueous solutions which are approximately neutral in reaction, and which contain high concentrations of the calcium and/or other polyvalent metal in a form available for exerting therapeutic action. The new compositions are useful in the veterinary field for treating a number of ailments, including milk fever (parturient paresis). The use of solutions of salts of these polyvalent materials by injection for the treatment of a variety of diseases of animals is well established. The present invention relates to improved compositions whereby administration of appropriate quantities of these polyvalent materials, is simplified, is made safer, is made with less danger of side effects and, in some cases we have demonstrated, with increased efficacy. Because the new compositions contain boron, we have not yet contemplated their use in the field of human medicine.

In the treatment of milk fever in cattle, the use of calcium gluconate solutions, stabilized with boric acid to permit the use of fairly concentrated solutions, has become almost standard treatment. The cause of the disease is not known, but it is known that the intravenous injection of calcium-containing solutions is very effective in treating the disease, with recovery almost invariable. However, lately it has been noted that the number of animals suffering relapses after initial treatment, and requiring retreatment, has been increasing. The new compositions of the invention seem, when used clinically, to effect cure with fewer relapses. We have also shown that when the same amount of calcium is injected in the form of the new compositions, and in the form of the heretofore standard stabilized calcium gluconate solutions (calcium gluconate plus boric acid), the rise in calcium blood level is higher, and more sustained with the new compositions than with the compositions heretofore available.

The new compositions of the invention contain the polyvalent metal in solution, and presumably in combination, in amount considerably in excess of that stoichiometrically equivalent to the gluconic acid combined therein, and thus differ from the compositions heretofore available, such as those described in Patent 2,007,786. In the compositions heretofore available, calcium gluconate has been dissolved in water along with boric acid or certain compounds of boric acid, forming what has been assumed to be calcium borogluconate, with the formula $Ca(C_6H_{11}O_7)_2 \cdot B_2O_3 \cdot H_2O$. It will be noted that in such compositions, there is present one equivalent of calcium for each equivalent of gluconic acid. In the new compositions of the present invention, there is present at least one equivalent of the polyvalent metal for each equivalent of gluconic acid plus one equivalent of polyvalent metal for each mole of boron compound, e.g., orthoboric acid. The polyvalent metal, the gluconic acid and the boron compound are, we believe, chemically combined in the form of polyvalent metal gluconyl borates, with the carboxy group of the gluconic acid linked to metal and with boron linked to the gluconic acid radical at the 5 carbon atom through an oxygen atom and to the polyvalent metal through an oxygen atom. We think it is also probable that the new compositions contain mixtures of different polyvalent metal gluconyl borates, depending upon the selection of the relative proportions of the materials used, but in any event, they contain considerably more calcium or other polyvalent metal per equivalent of gluconic acid than do such compositions as are described in Patent 2,007,786 and as have heretofore been available.

The relative proportions of gluconic acid and boric acid used in preparing the new compositions may be varied, and we believe that the nature of the particular product obtained depends upon the relative proportions selected, although it must be recognized that in any event mixtures are probably obtained with one or another of the complexes which we postulate predominating. We have indications that if one mole of gluconic acid is used with two of boric acid, the product obtained differs from those obtained with two moles of gluconic acid and one of boric acid, or three moles of gluconic acid and one of boric acid, or one mole of gluconic acid and one of boric acid, although each has the capacity of combining with and forming stable solutions with calcium or other polyvalent metal in amount corresponding to one equivalent of metal for each mole of gluconic acid plus one equivalent of metal for each mole of boric acid. In the examples below we shall give our theory as to the structure of some of these compounds, although it is to be understood that the structures of some of the compounds have not been firmly established.

Some of the new compositions exhibit extraordinary solubility in water. Thus, a composition prepared from 2 moles of gluconic acid, 1 mole of boric acid and 3 equivalents of calcium has a solubility in water such that 7 grams of the product dissolve in 3 grams of water to form a clear, viscous solution. With other of the new compositions, the solubility is considerably less. Thus, a product prepared from 2 moles of gluconic acid, 2 moles of boric acid, 2 equivalents of calcium and 2 equivalents of magnesium does not dissolve in 19 parts of water if prepared in accordance with the directions of Example IV below. On the other hand, 8 parts of material prepared from 2 moles of gluconic acid, 1 mole of boric acid, 2 equivalents of calcium and 1 equivalent of magnesium prepared as in Example III below, dissolve readily in 2 parts of water to form a clear, viscous solution.

The new compositions are readily prepared by heating an aqueous mixture of the appropriate proportions of gluconic acid, boric acid, or boron oxide, or a polyvalent metal borate, then adding the polyvalent metal oxide, hydroxide or carbonate. Because gluconic acid is commonly prepared and available in the form of the calcium salt, the compositions will ordinarily be prepared with the use of calcium gluconate, boric acid and polyvalent metal oxide, hydroxide or carbonate, in which case the compositions will contain calcium as the only polyvalent metal, or calcium and another polyvalent metal, depending upon the selection of the oxide, hydroxide or carbonate. For the production of compositions which do not contain calcium as, for example, compositions containing only magnesium as the polyvalent metal, it is convenient to convert the calcium gluconate or gluconic acid to the magnesium salt, and use it. In all cases, the amount of polyvalent metal used or combined in the compositions is in excess of the stoichiometric equivalent of the gluconic acid by an amount corresponding to at least 1 equivalent per mole of boric acid. We have indications that these compositions will, when dissolved in water, dissolve polyvalent metal hydroxide or carbonate in excess of the stoichiometric equivalent, and further that they will dissolve excess calcium gluconate. We have also observed that the aqueous solutions of these new compositions seem to have a lower degree of ionization than do the boric acid stabilized gluconates heretofore available, and it may be that it is this characteristic which accounts for the increased and prolonged blood levels obtained in normal animals. In any event, one objective manifestation of this which we have observed is a lessening of sloughing of tissue if the material is accidently injected into subcutaneous tissues. Indeed, we have found that aqueous solutions of the new compositions can be injected subcutaneously or intramuscularly without the sloughing or necrosis which may accompany such injection of the calcium or magnesium compounds heretofore available. A further advantage we have observed is that the viscosity of the solutions of the new compositions of comparable calcium content is less than that of solutions of the stabilized calcium gluconate solutions heretofore available, thus simplifying administration.

The invention will be illustrated by the following examples but it is not limited thereto.

*Example I*

224 grams of calcium gluconate and 31 grams of boric acid are dissolved in about 800 cc. of distilled water, by heating and gentle stirring. The solution is heated to the boiling point and a slurry, produced by slaking 15 grams of calcium oxide in water, is added. The solution is concentrated to about 800 grams, filtered and water is added q.s. 1000 grams. If 200 grams of this solution are added to a liter of methanol with stirring, a precipitate forms. This is separated by decantation, slurried with 800 cc. methanol, separated again and washed on a filter with two 200 cc. portions of methanol. The resulting product when dried in air contains 12.73% calcium calculated on a dry basis. 7 grams of this air dried material dissolves readily in 3 grams of water to form a clear, viscous solution. We believe this product is properly termed tricalcium bis(5,5', O orthoborodiyldi-D-gluconate) and that it has the formula:

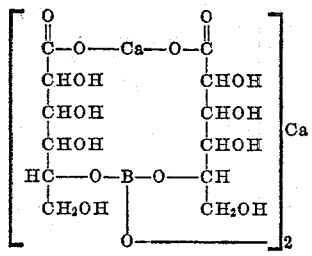

*Example II*

112 grams of calcium gluconate and 31 grams of boric acid are dissolved in 800 grams of water by gentle stirring and heating and brought to a boil. To the boiling solution is added a slurry prepared by slaking 30 grams of calcium oxide in water. The solution is concentrated by boiling to about 800 grams, filtered and water is added q.s. 1000 grams. 100 grams of this solution are added to 1 liter of methanol, a precipitate forms which is collected by filtration, agitated with another 800 cc. of methanol, separated and washed with two 200 cc. portions of methanol. The resulting product is dried in vacuum over calcium chloride for 48 hours. A product is obtained which analyzes 14.86% calcium on a dry basis. We believe this compound is properly termed Dicalcium bis(5,O, orthoboromonyl-D-gluconate) and has the formula:

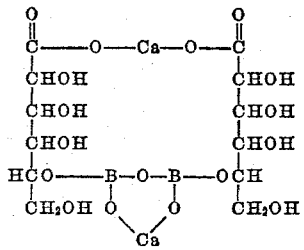

*Example III*

To a boiling solution of 224 grams of calcium gluconate and 31 grams of boric acid are added 11 grams of magnesium oxide in sufficient water to form a thin slurry. The solution is boiled until the weight is reduced to about 800 grams, is filtered and water is added q.s. 1000 grams. Separation of the product from this solution by the procedure of Example I gives a product which contains 8.75% calcium and 2.60% magnesium on a dry basis. 8 parts of this product dissolves readily in 2 parts of water to form a clear, viscous solution. We believe this product is properly termed B Magnesium, C,C' dicalcium bis(5,5',O orthoborodiyldi-D-gluconate) and has the formula:

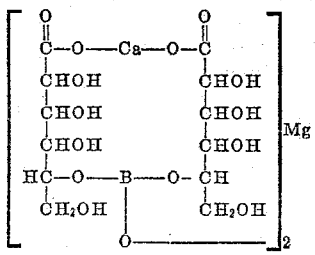

*Example IV*

To a boiling solution of 224 grams of calcium gluconate, 62 grams of boric acid and 800 cc. of water is added a thin slurry containing 22 grams of magnesium oxide in water. When the solution is complete, a precipitate appears and continues to form on continued boiling and stirring. After 1 hour boiling the precipitate is removed by filtration, washed with water and dried in vacuum over calcium chloride. The material contains 7.66% calcium and 4.50% magnesium on a dry basis. One part of this material does not completely dissolve in 19 parts of water. We believe this product is properly termed B Magnesium, C calcium bis(5,O, orthoboromonyl-D-gluconate) and has the formula:

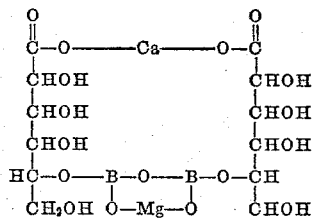

*Example V*

To a boiling solution of 207 grams of magnesium gluconate, 31 grams of boric acid and 800 cc. of water is added a slurry prepared by slaking 15 grams of calcium oxide, in water. The solution is filtered and sufficient water is added to the filtrate to make 1000 grams. Recovery of product from this solution by the procedure of Example II gives a product containing 5.36% magnesium and 4.69% calcium on a dry basis. 7 parts of the dried material dissolves readily in 3 parts of water to form a clear, viscous solution. We believe the product is properly termed B Calcium,C,C', dimagnesium bis(5,5', O,orthoborodiyldi-D-gluconate) and has the formula:

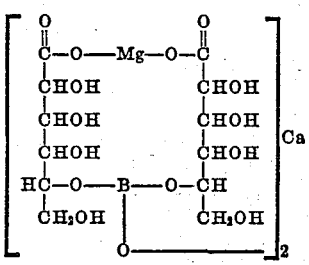

*Example VI*

To a boiling solution of 207 grams of magnesium gluconate and 62 grams of boric acid in 800 cc. of water is added a slurry obtained by slaking 31 grams of calcium oxide in water. The solution is filtered and made up to 1000 grams with water. A solid product isolated as in Example II contains 4.40% magnesium on a dry basis. 3 parts of the dry product dissolve readily in 7 parts of water. 4 parts do not dissolve completely in 6 parts of water. We believe the product is proprely termed B Calcium,C magnesium,bis(5,O, orthoboromonyl-D-gluconate) and has the formula:

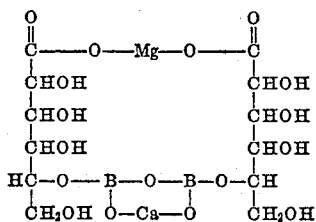

*Example VII*

To a boiling solution of 224 grams of calcium gluconate and 31 grams of boric acid in 700 cc. of water are added 50 grams of reduced iron. The stirrer is removed, the beaker covered with a cover glass, and heating is continued for 3 hours, water being added from time to time to maintain the volume. The solution is filtered from unreacted iron. It is almost colorless. It tends to oxidize rapidly to form a dark greenish yellow solution. One hundred and ninety grams of the hot filtrate are added to one liter of methanol with vigorous stirring. The mixture is allowed to settle and the supernatant fluid decanted. The precipitate is suspended in 800 cc. of methanol, allowed to settle and the supernatant fluid discarded. The precipitate is then collected on a filter and washed several times with methanol, and then dried over calcium chloride. The dried product is a light yellow powder that dissolves readily in water forming a solution that tends to darken on exposure to air. Analysis shows 8.45% calcium and 5.75% iron on a dry basis. We believe the product is properly termed B,Ferrous, C,C' dicalcium bis(5,5',O, orthoborodiyldi-D-gluconate) and has the formula:

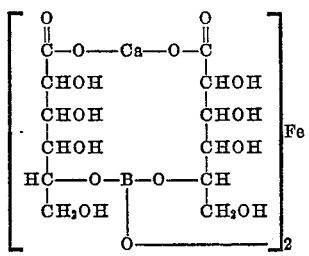

*Example VIII*

To a boiling solution of 241 grams of ferrous gluconate and 31 grams of boric acid in 600 cc. of water is added a slurry made by slaking 15.3 grams of calcium oxide in 100 cc. of water. The solution is filtered and the filtrate made up to 1000 grams with water. The product may be recovered by the procedure of Example II giving a dry product containing 11.10% iron and 4.52% of calcium on a dry basis. 7 parts of this material dissolve readily in 3 parts of water. We believe the product is properly termed B,Calcium,C,C', diferrous bis(5,5'-O, orthoborodiyldi-D-gluconate) and has the formula:

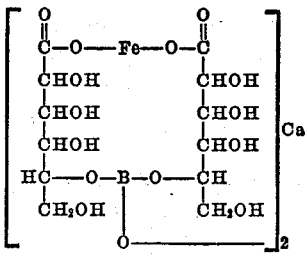

*Example IX*

224 grams of calcium gluconate and 31 grams of boric acid are dissolved in 700 cc. of water by stirring and heating. The solution is allowed to cool to room temperature and 50 grams of cupric acetate monohydrate are added. The mixture is stirred until it dissolves and sufficient water is added to make 1000 grams of solution. The solid product is recovered from this solution by the procedure of Example I and dried in vacuum over calcium chloride. The final product is a light blue powder which is readily soluble in water. It analyzes 6.48% copper on a dry basis. We believe this product is properly termed B,Cupric,C,C',dicalcium bis(5,5',O, orthoborodiyldi-D-gluconate) and has the formula:

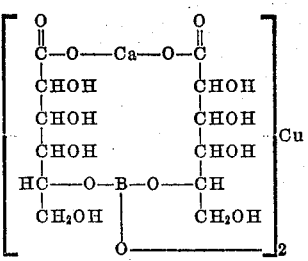

*Example X*

To a boiling solution of 230 parts of manganese gluconate and 62 grams of boric acid in 800 cc. of water is added a slurry obtained by slaking 31 grams of calcium oxide in water. The solution is filtered and made up to 1000 grams with water. It contains a calcium-manganese gluconyl borate which we believe is properly termed B,Calcium,C,manganous bis(5,O, orthoboromonyl-D-gluconate) and has the formula:

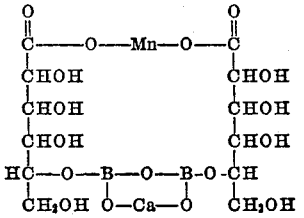

*Example XI*

336 grams of calcium gluconate, 31 grams of boric acid and the slurry obtained by slaking 31 grams of calcium oxide in water is heated in sufficient water to make 1,000 grams. The solution, when added slowly to methanol, deposits a precipitate of tetracalcium bis(5,5',5'',O, orthoborotriyltri-D-gluconate),

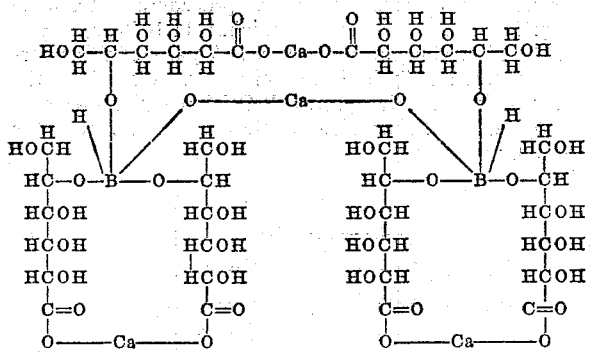

It will be noted that in the foregoing examples the products have been prepared so that there are combined in them stoichiometrically equivalent proportions of the gluconic acid, the boric acid and the polyvalent metal theoretically required to form the definite compounds which we believe are formed. Obviously, selection of intermediate proportions of the components will undoubtedly lead to the formation of mixtures of compounds, such mixtures like the individual definite compounds, being characterized by the presence of polyvalent metal in amount substantially exceeding that corresponding to the gluconic acid present, and characterized by a pH value in aqueous solution aproximating neutrality, in contrast with the relatively acid products heretofore available. Also, we have noted that the new compositions have a noticeable solubilizing effect on calcium gluconate and other calcium or other polyvalent metal compounds. Thus, an aqueous solution from 1 mole of calcium gluconate, 2 moles of boric acid and 1 mole of calcium hydroxide will dissolve and hold in clear solution up to 1 additional mole of calcium gluconate.

In the examples, the excess calcium or other polyvalent metal has been supplied as the hydroxide or hydrated oxide (except in Example IX). The carbonates or the like may be used with substantially the same results. Further, instead of boric acid, boron oxide or the polyvalent metal borates may be used. The gluconic acid may be used as the salt, as in the examples, or as the free acid, or as glucono-delta-lactone, in which case an equivalent increase in the amount of polyvalent metal oxide, hydroxide, carbonate, or the like is required.

Finally, in each example, isolation of a dry product is described. It is to be understood that ordinarily no dry product will be isolated. The new compositions will simply be prepared as aqueous solutions of the desired concentration, as required for calcium or other polyvalent metal therapy in accordance with known practices, and used in that form providing the advantages of increased and more prolonged blood levels, less danger of side effects, such as shock, sloughing or necrosis of tissues, feasibility of intramuscular or subcutaneous injection, decrease in volume of liquid required for a given amount of polyvalent metal, and decreased viscosity of the solutions of given concentration of polyvalent metal.

We claim:

1. An injectable aqueous solution containing at least one polyvalent metal of the group consisting of calcium and magnesium, combined with gluconic acid and boric acid in the form of a polyvalent metal gluconyl borate in proportions such that it contains at least one equivalent of polyvalent metal for each equivalent of gluconic acid and each mole of boric acid combined therewith, said solution being stable and approximately neutral.

2. A solution as in claim 1 in which the metal is calcium.

3. A solution as in claim 1 in which the metal is magnesium.

4. An injectable aqueous solution containing calcium and magnesium combined with gluconic acid and boric acid in the form of a polyvalent metal gluconyl borate in proportions such that it contains at least one equivalent of polyvalent metal for each equivalent of gluconic acid and each mole of boric acid combined therewith, said solution being stable and approximately neutral.

References Cited in the file of this patent

UNITED STATES PATENTS

| | | |
|---|---|---|
| 2,007,786 | Austin | July 9, 1935 |
| 2,097,235 | Schmidt et al. | Oct. 26, 1937 |
| 2,569,403 | Cook et al. | Sept. 25, 1951 |